(12) United States Patent
Joshi et al.

(10) Patent No.: US 10,573,170 B2
(45) Date of Patent: Feb. 25, 2020

(54) CONSUMPTION BASED MEDIA PLAYBACK

(71) Applicants: Mandar Anant Joshi, Gainesville, FL (US); Tanmay Avinash Dharmadhikari, Sandy Springs, GA (US)

(72) Inventors: Mandar Anant Joshi, Gainesville, FL (US); Tanmay Avinash Dharmadhikari, Sandy Springs, GA (US)

( * ) Notice: Subject to any disclaimer, the term of this patent is extended or adjusted under 35 U.S.C. 154(b) by 398 days.

(21) Appl. No.: 15/415,841

(22) Filed: Jan. 25, 2017

(65) Prior Publication Data

US 2017/0214730 A1    Jul. 27, 2017

Related U.S. Application Data

(60) Provisional application No. 62/286,758, filed on Jan. 25, 2016.

(51) Int. Cl.
*G08C 17/02* (2006.01)
*H04N 21/6587* (2011.01)

(52) U.S. Cl.
CPC ......... *G08C 17/02* (2013.01); *G08C 2200/00* (2013.01); *H04N 21/6587* (2013.01)

(58) Field of Classification Search
CPC ...................... G08C 2200/00; G08C 2201/93; G08C 17/02; H04N 21/44218; H04N 21/6587; A47G 23/16; G01F 23/00; G01F 23/26; G01F 23/22; G01F 23/0076; G01F 22/00; G01F 23/2962; G01F 1/00; G06Q 10/087
USPC ......................................................... 709/219
See application file for complete search history.

(56) References Cited

U.S. PATENT DOCUMENTS

| 10,161,782 B2 * | 12/2018 | Saltzgiver | ............ G01F 23/263 |
| 2015/0346013 A1 * | 12/2015 | Feng | ................... A61M 5/1414 702/55 |

* cited by examiner

*Primary Examiner* — Tan Doan (57) ABSTRACT

Technical solutions are described for controlling media playback based on consumption of contents in a cup. For example, an apparatus that controls the playback receives an amount of contents in the cup. The apparatus includes one or more sensors that keep track of amount of the contents and/or a rate of consumption of the contents. In an example, the apparatus transmits a signal to a media device in response to a predetermined threshold being greater than the rate of consumption of contents. In response, the media device may pause, stop, or play media. Additionally or alternatively, in response, the media device may display a user interface that describes a status of consumption of contents, such as the rate of flow.

20 Claims, 5 Drawing Sheets

CONSUMPTION BASED MEDIA PLAYBACK

BACKGROUND

The present application generally relates to controlling media playback, particularly based on food consumption.

Feeding young children is probably the most important chore in a parent's life. Providing sufficient nutrition to children is important and difficult because of children's picky attitude towards food. With the advent of media devices such as tablets and Smartphones parents playback media such as videos, audio, games, images, and other media on the tablets or Smartphones as an incentive to make their children eat. However, children often spend too long to consume the food while being distracted by the media, such as watching videos.

SUMMARY

One general aspect includes an apparatus including a processor configured to receive an amount of contents in a vessel. The apparatus also includes a communication interface configured to transmit a signal in response to a predetermined threshold being greater than a rate of change of the amount of contents. The apparatus further includes a sensor configured to detect the amount of contents in the vessel and transmit the amount for receipt by the processor, where the sensor detects the amount of contents based on weight of the vessel. The sensor detects the amount of contents based on displacement of the contents, the contents being fluid. The signal includes an instruction to modify media playback. The processor is configured to calculate the rate of change of the amount of contents based on the amount of contents and a previous amount of contents. The sensor unit detects the rate of change of the amount of contents based on monitoring a weight of the contents. Alternatively or in addition, the sensor unit detects the rate of change of the amount of contents based on monitoring a displacement of the contents. Alternatively or in addition, the sensor unit detects the rate of change of the amount of contents based on monitoring a volume of the contents.

Another general aspect includes an apparatus including: a sensor unit configured to detect a rate of change of an amount of contents in a vessel. The apparatus also includes a communication unit communicably connected to the sensor unit, the communication unit configured to transmit a signal in response to a predetermined threshold being greater than the rate of change of the amount of contents. The signal includes an instruction to modify media playback. The sensor unit detects the rate of change of the amount of contents based on monitoring a weight of the contents. Alternatively or in addition, the sensor unit detects the rate of change of the amount of contents based on monitoring a displacement of the contents. Alternatively or in addition, the sensor unit detects the rate of change of the amount of contents based on monitoring a volume of the contents. Alternatively or in addition, the sensor unit detects the rate of change of the amount of the contents based on monitoring a flow of the contents through an outlet of the container. In addition, the apparatus is configured such that the signal is a first signal and the transmitter is further configured to transmit a second signal for receipt by the receiver in response to the rate of change of the amount of contents in the container being equal to or more than the predetermined threshold.

Yet another aspect includes a system including: a transmitter configured to transmit a signal in response to a rate of change of amount of contents in a container being less than a predetermined threshold, the signal being transmit for receipt by a receiver. The system also includes the receiver configured to modify media playback in response to receipt of the signal. The system further includes a sensor unit configured to detect the rate of change of the amount of the contents in the container, the sensor unit being communicably connected with the transmitter. The signal is a first signal and the transmitter is further configured to transmit a second signal for receipt by the receiver in response to the rate of change of the amount of contents in the container being equal to or more than the predetermined threshold. The sensor unit detects the rate of change of the amount of the contents based on monitoring a flow of the contents through an outlet of the container. Alternatively or in addition, the sensor unit detects the rate of change of the amount of the contents based on monitoring a weight of the contents in the container.

BRIEF DESCRIPTION OF DRAWINGS

The examples described throughout the present document may be better understood with reference to the following drawings and description. The components in the figures are not necessarily to scale. Moreover, in the figures, like-referenced numerals designate corresponding parts throughout the different views.

DETAILED DESCRIPTION

The present application describes technical solutions for linking media playback and food consumption. Food consumption includes eating solid foods such as rice, bread, noodles, pasta, fruits, vegetables, and other such food items. Alternatively or in addition, food consumption includes drinking liquids such as milk, juice, water, smoothie, or any other drinks. Alternatively or in addition, food consumption includes eating any other type of food items.

In one embodiment, an apparatus controls media playback by the media device based on consumption of food by a child. Alternatively or in addition, the consumption may be by a user of any other age group, such as a senior (55+ years), or a teenager (13-19 years), or any other user. The examples described throughout the present document use a child as a user of a vessel, or a container, however other users may use the container in similar manner, as will be obvious to a person skilled in the art.

The apparatus may monitor a rate at which contents in a container are consumed. The apparatus may compare the rate of consumption with a predetermined threshold. The apparatus may change a state of the media playback by the media device based on whether the rate of consumption is above or below the predetermined threshold.

For example, the apparatus monitors a flow of the fluids from a container that is holding the fluid. The apparatus may monitor the flow through an outlet of the container, or through a straw, or a combination thereof. In another embodiment, the apparatus may monitor the weight of contents in the container and control media playback on the media device based on a rate of change of the weight. For example, the apparatus monitors the rate at which the weight decreases, and thus, the rate at which food is consumed.

The apparatus may communicate with the media device and control the media playback on the media device based on the flow of the fluid. For example, the apparatus may permit the media playback to continue as long as the rate of the flow, and consequently the rate of consumption, is above a predetermined threshold. Accordingly, the apparatus may ensure that the fluid in the container flows through the straw and presumably in to the child's mouth. The apparatus may pause or stop the media playback on the media device if the rate of flow from the container falls below the predetermined threshold.

In another example, the apparatus permits the media playback to continue as long as the rate of change of the weight is above a predetermined threshold; and, the apparatus pauses or stops the media playback if the rate of change of the weight fails to satisfy the predetermined threshold.

In one embodiment, the apparatus pauses or stops the media playback on the media device after a predetermined time delay since the rate of flow falls below the predetermined threshold. For example, the apparatus may delay for three to five seconds, after detecting the lower rate of flow from the container. Other delay times are possible, and in an example, the delay may be configurable. In a further embodiment, the apparatus may prompt the child, for example through the media device that the media playback will pause if the child does not continue consuming the contents. Thus, the apparatus may incentivize the child to resume drinking by the prompt. In an embodiment, the apparatus resumes the media playback on the media device if the rate of flow of the fluid from the container reaches at least the predetermined threshold. In yet another embodiment, the apparatus may prompt the child, for example, through the media device, that the media playback will resume if the child resumes consuming the contents, thus incentivizing the child to restart consuming the contents.

In one embodiment, the apparatus pauses or stops the video being played on the media device after a few seconds, for example, after twenty to thirty seconds, if the drop in the weight of the food in the container stops or falls below the predetermined threshold. In a further embodiment, the apparatus provides an indication to the child, for example, through the media device, that the media playback will pause unless the food consumption continues, thereby prompting the child to resume eating/drinking. In an even further embodiment, the apparatus restarts the media playback if the drop in the weight of the food in the container restarts. In yet another embodiment, after the media playback has been stopped/paused for a predetermined duration, the apparatus provides an indication to the child, for example, through the media device, that the media playback will restart if the child resumes consuming the food thereby prompting the child to restart eating.

Figure 1:
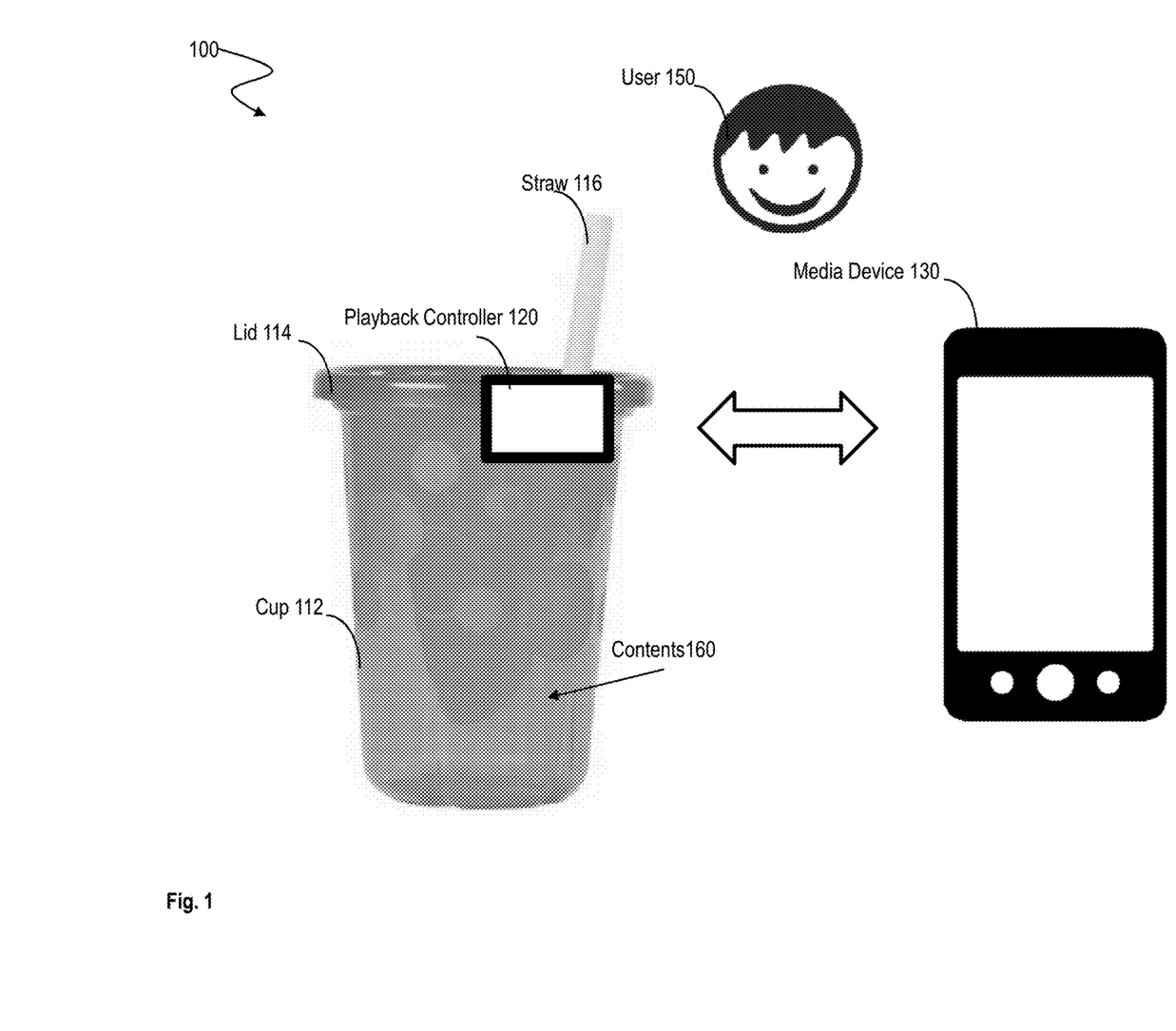
FIG. 1 illustrates an example of controlling media playback based on food consumption in accordance with an embodiment.

FIG. 1 illustrates an example of controlling media playback based on food consumption. In the example, a child 150 consumes contents 160 in a cup 112. The cup may be made of any material such as plastic, metal, foam, or any other material. The cup 112 may have a lid 114. The lid 114 may be made of the same material as the cup 112, or any other material. In an example, the cup 112 and the lid 114 may be integrally assembled, and the entire assembly may be referred to as the cup 112. Alternatively, the lid 114 may be separable from the cup 112.

The contents 160 may be liquid, in which case the child 150 may consume the contents 160 using a straw 116. The straw 116 may be made of the same material as the cup 112 and/or the lid 114. Alternatively, the straw 116 may be made of any other material. The straw 116 may be an integral part of the lid 114. Alternatively, the straw 116 may be separable from the lid 114 and/or the cup 112.

A media device 130 plays back media that may entertain the child 150 during consumption of the contents 160. The media device 130 may be a smartphone, a tablet computer, a laptop computer, a desktop computer, a television, a set top box, or any other apparatus capable of media playback. The media playback may include playback of a video, an audio, an image, an animation, a game, or any other multimedia presentation or a combination thereof. The media playback may include playback of the media that is stored on a memory of the media device 130. Alternatively or in addition, the media playback includes playback of a media from a remote source, such as a server of an online media playback service provider, for example, YOUTUBE™, NETFLIX™, AMAZON™, PANDORA™, or any other server. Alternatively or in addition, the media is accessed from another device in a local area network (LAN), such as a home or office network, for example, a network attached storage (NAS), a computer, or any other device that is capable to store and share media with the media device.

The media device 130 communicates wirelessly using communication standards and protocols such as Ethernet, Wi-Fi, Bluetooth, Near Field Communication (NFC), or any other short and/or long range wireless communication standards and protocols. In another example, the media device 130 receives communication via Internet of Things (IoT) techniques. For example, in case the media device 130 is playing media from a remote server, the remote server may receive command(s), such as to play/pause/stop/forward/rewind the media playback independently of the media device 130, and the media playback on the media device 130 is affected accordingly. The media device 130, via the communication, receives a command to alter the state of media playback, such as play, pause, resume, stop, forward, rewind, or any other change in state. In an example, the media device 130 includes computer executable instructions on a non-transitory computer readable storage medium that facilitates the media device 130 to receive a command to alter the media playback state. The non-transitory computer readable storage medium may be part of the media device 130. Additionally, the media device 130 includes one or more processors that execute the computer executable instructions.

Typically, the media playback is independent of the child (150) consumption of the contents 160. A playback controller 120 monitors the consumption of the contents 160 and controls the media playback according to the consumption, such as rate of consumption. The playback controller 120 may be an apparatus that includes hardware such as electronic circuitry, for example, a processor, a memory, a communication interface, and the like. The apparatus may further include computer readable memory that includes computer executable instructions that are executed by one or more hardware components of the playback controller 120. The execution of the computer executable instructions causes the playback controller 120 to operate and control the playback of the media device 130 according to the consumption of the contents 160.

The playback controller 120 may further include one or more sensors to monitor the consumption of the contents 160. For example, the sensors may include a weight sensor, an image sensor, a flow-rate sensor, a pressure sensor, an acoustic sensor, or any other sensor that measures physical attributes. The playback controller 120, based on the measurements from the one or more sensors sends commands that control playback of the media being played by the media device 130. The playback controller 120 may send the command for receipt by the media device 160 via Bluetooth®, Wi-Fi®, NFC®, or any other communication techniques. Alternatively or in addition, the playback controller 120 sends command(s) to control the media playback using IoT techniques, such as by sending commands for receipt by a remote server that is facilitating media playback by the media device 130.

Figure 2:
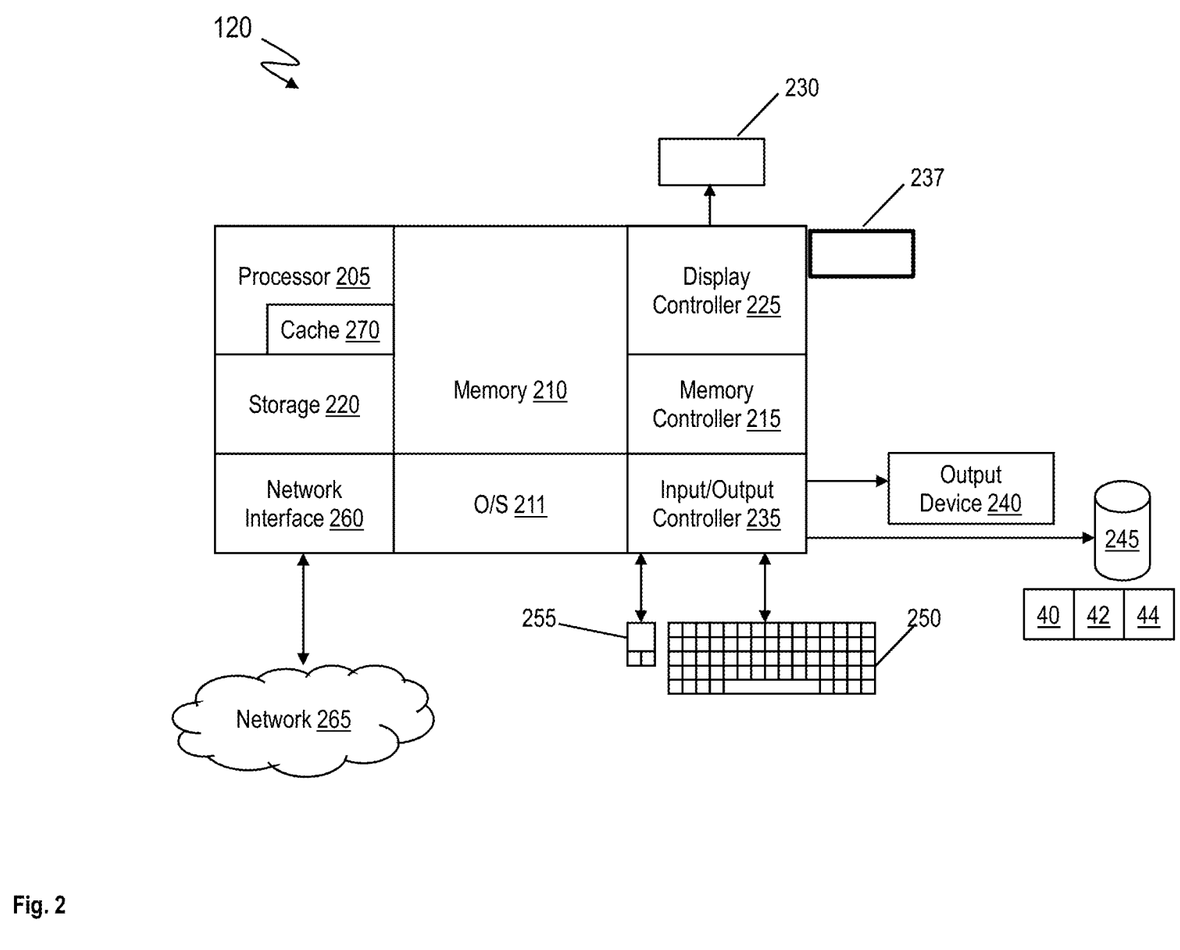
FIG. 2 illustrates an example playback controller in accordance with an embodiment.

FIG. 2 illustrates an example playback controller 120. The playback controller 120 includes, among other components, a processor 205, memory 210 coupled to a memory controller 215, and one or more input devices 245 and/or output devices 240, such as peripheral or control devices, that are communicatively coupled via a local I/O controller 235. These devices 240 and 245 may include, for example, battery sensors, attribute sensors (a weight sensor 40, a pressure sensor 42, an image sensor 44), indicator/identification lights and the like. The sensors may additionally or alternatively include a flow-rate sensor, an acoustic sensor, and the like. Input devices such as a conventional keyboard 250 and mouse 255 may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications. The sensors ensure that the flow of the contents 160 is from the cup 112 to the user 150, and not the other way, that is in reverse direction (from user 150 to the cup 112). In an example, the playback controller 120 may include a separate sensor that detects if the contents 160 are flowing into the container, for example from the user 150 to the cup 112, or any other user to the cup 112. In case reverse flow (into the cup 112) is detected, the playback controller 120 may pause (or stop) the media playback by sending an instruction to the media device 130. Alternatively or in addition, the playback controller 120, in response to detecting the reverse flow, and ensure that the reverse flow is not being used to determine that the user 150 is consuming the contents 160.

The I/O devices 240, 245 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the playback controller 120, a semiconductor based microprocessor (in the form of a microchip or chip set), a macroprocessor, or other device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, and so on).

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods of this disclosure.

The playback controller 120 may further include a display controller 225 coupled to a user interface or display 230. In some embodiments, the display 230 may be an LCD screen. In other embodiments, the display 230 may include a plurality of LED status lights. In some embodiments, the playback controller 120 may further include a network interface 260 for coupling to a network 265. The network interface 260 may include a receiver and a transmitter to receive and/or send signals via the network 265. The network 265 may be an IP-based network for communication between the playback controller 120 and an external server, client and the like via a broadband connection. In an embodiment, the network 265 may be a satellite network. The network 265 transmits and receives data between the playback controller 120 and external systems. In some embodiments, the network 265 may be a managed IP network administered by a service provider. The network 265 may be implemented in a wireless fashion, for example, using wireless protocols and technologies, such as WiFi, WiMax, satellite, or any other. The network 265 may also be a packet-switched network such as a local area network, wide area network, metropolitan area network, the Internet, or other similar type of network environment. The network 265 may be a fixed wireless network, a wireless local area network (LAN), a wireless wide area network (WAN) a personal area network (PAN), a virtual private network (VPN), intranet or other suitable network system and may include equipment for receiving and transmitting signals.

The playback controller 120 may be an apparatus, or a system, or a device that is integrated with the cup 112, or the straw 117, the lid 114, or a combination thereof. In another example, the playback controller 112 may be external to the cup 112, the straw 117, and the lid 114. For example, the playback controller 120 may be shaped like a ring that may be placed around the straw 117, or around the cup 112, or around the lid 114. In another example, the playback controller 120 may include a clip 237 that facilitates attaching the playback controller 120 to the cup 112, the lid 114, or the straw 117. In yet another example, the playback controller 120 may be part of, or itself be shaped like a disc that is attached with the cup 112, the lid 114, or the straw 117.

Figure 3:
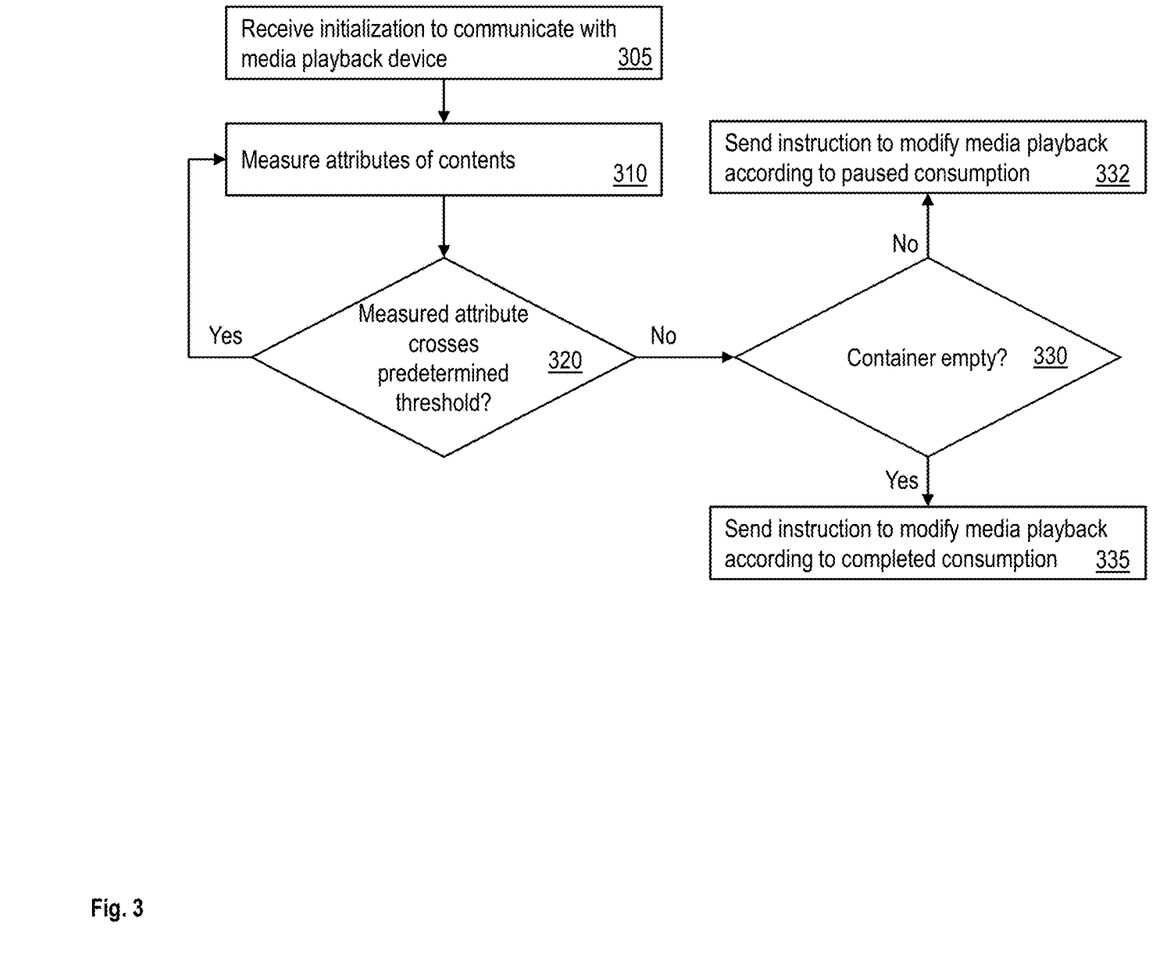
FIG. 3 illustrates a flowchart of a method for transmitting a signal in response to a rate of change of amount of contents in a container in accordance with an embodiment.

FIG. 3 illustrates a flowchart of a method for transmitting a signal in response to a rate of change of amount of contents in a container being less than a predetermined threshold. In an example, the playback controller 120 implements the method. The flowchart in FIG. 3 illustrates an example sequence of operations of the method, and another example may implement the operations in a different order. In yet another example, one or more of the operations may be combined or skipped based on one or more parameters.

In an example, the playback controller 120 receives an initialization to communicate with the media device 130, as shown at block 305. For example, the initialization may be in the form of changing a state of a switch on the playback controller 120. In another example, the initialization may be received as a command via the network interface 260, or in any other form. In response to the initialization, the playback controller 120 sets up a communication path with the media device 130. For example, the playback controller 120 sets up a predetermined communication protocol connection with the media device 130, such as a Bluetooth® connection, an NFC® connection, or any other communication connection. In another example, the playback controller 120 sets up a communication path with the media device 130 over the Internet, such as using IoT techniques.

The playback controller 120 measures attributes of the contents 160 in the cup 112, as shown at block 310. In an example, the playback controller 120 measures the attributes in response to an indication to begin measuring the attributes. The playback controller 120 continues to measure the attributes at a predetermined frequency. For example, the playback controller 120 measures the attributes every second, every five seconds, every microsecond, every 200 microseconds, or any other frequency that may be configured. The attributes measured may include an amount of contents, a rate of change of the amount of contents, a flow of contents, a rate flow of contents, or any other attributes of the contents 160. Alternatively or in addition, the playback controller 120 measures a rate of swallowing by the user 150. The predetermined thresholds are configured to indicate a consumption rate at which the user 150 is to consume the contents 160. In an example, the amount of contents may be measured based on volume of the contents. Alternatively or in addition, the amount may be measured based on weight of the contents. The rate of change of the amount of the contents may be recorded according to rate of change of the volume and/or the weight.

For example, the playback controller 120 may keep track of the volume of the contents 160 by periodically capturing an image of the container and keeping identifying a level of the contents 160 in the cup 112. Alternatively or in addition, the playback controller 120 tracks the volume based on SONAR techniques, by transmitting waves, such as sound waves, and receiving reflection of the waves to determine depth, and thus volume of the contents in the cup 112. In yet another example, the playback controller 120 is equipped with a weighing scale that keeps track of the weight of the contents 160 in the cup 112. The playback controller 120 keeps track of the rate of change of the contents based on successive or a series of measurements of the amount of the contents 160. In another example, the playback controller 120 measures displacement of the contents 160 during consumption to measure a rate of flow of the contents.

The playback controller 120 compares the measured attributes with predetermined thresholds, as shown at block 320. If the measured attributes cross (for example, are more than or less than) the predetermined thresholds, the playback controller 120 deems that the contents 160 are being continuously consumed, at least at the predetermined rate indicated by the predetermined thresholds. In case the predetermined thresholds are not crossed, the playback controller 120 deems that the consumption of the contents 160 has paused. In another example, the playback controller 120 may be configured to identify whether the user 150 is consuming the contents 160 in the other way; that is, the user 150 is consuming the contents 160 in case the predetermined thresholds are not crossed and that the consumption has paused in case the predetermined thresholds are crossed.

If the user 150 is consuming the contents 160, the playback controller 120 continues measuring the attributes, as show at block 310. In case the user 150 stops or pauses the consumption, the playback controller 120 determines if the container 112 is empty, that is if the contents 160 have been emptied, as shown at block 330. For example, the playback controller 120 checks the measured amount of the contents, and if the amount is zero, the contents maybe zero. In another example, the playback controller 120 may determine that the container 112 is empty, (or that contents 160 have been consumed completely) based on a second predetermined threshold that may be configurable. The second predetermined threshold may be a value that is indicative of an empty container. For example, the second predetermined threshold may be a measureable value above zero. In yet another example, the playback controller 120 may determine that the container 112 is empty by taking an image of the container and identifying contents within the container by processing the image, such as edge detection, histogram analysis, or any other such techniques.

If the playback controller 120 determines that the consumption has stopped (or paused) and the container is not empty, the playback controller 120, in response, sends an instruction to modify media playback by the media device 130, as shown at block 332. For example, the instruction may pause media playback by the media device 130. In an example, the instruction may be an instruction for the operating system of the media device 130. Alternatively or in addition, the instruction may be for an application of the media device that may be playing the media on the media device 130. In yet another example, the instruction causes the media device 130 to display a user interface that instructs the user 150 to continue consumption of the contents 160, and that the media playback may resume once the user 150 resumes consumption.

Figure 4:
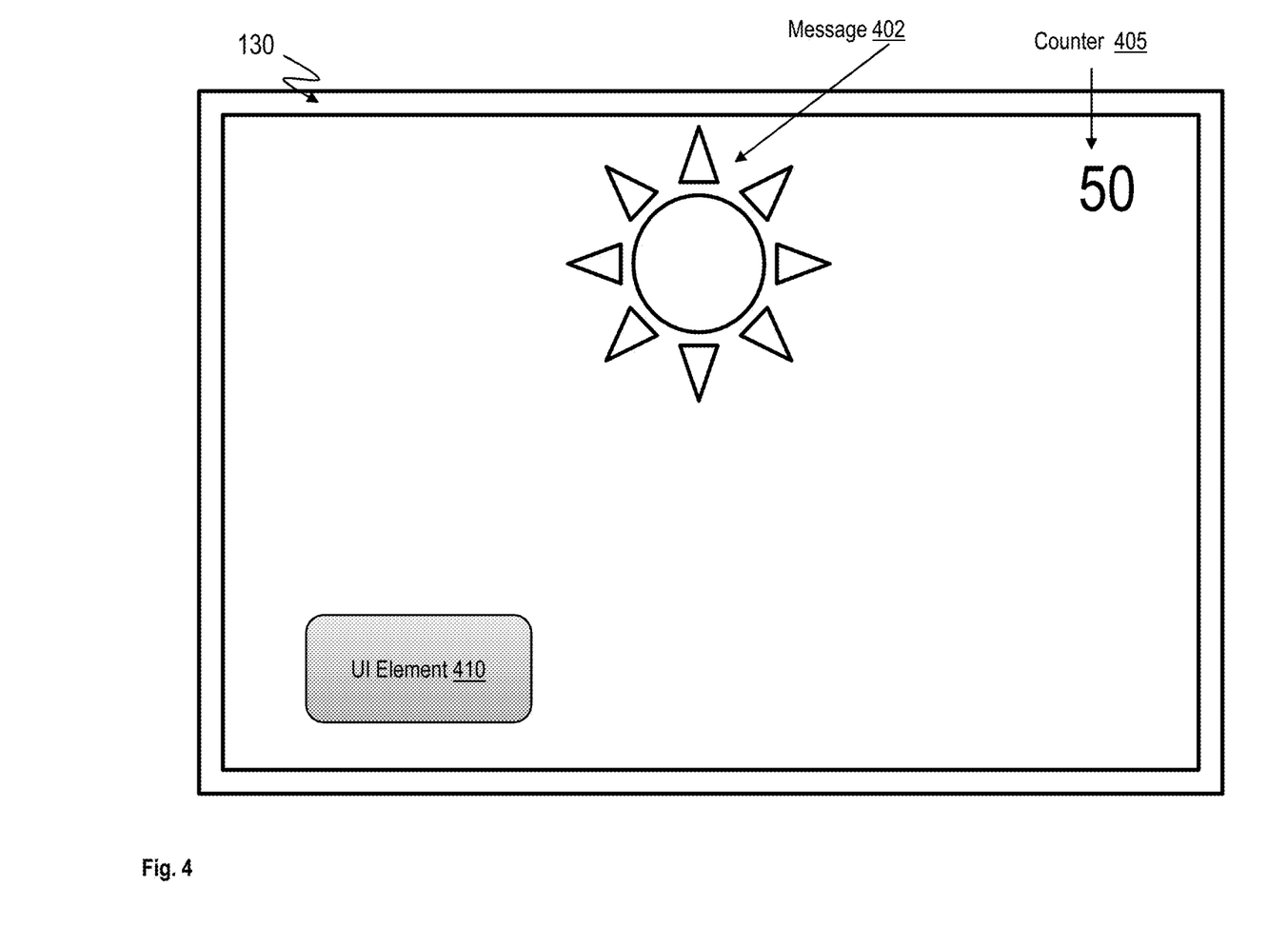
FIG. 4 illustrates an example user interface in accordance with an embodiment.

FIG. 4 illustrates an example user interface. The user interface may display a message 402. In an example, the message 402 may be a flashing display of text, and/or an animation depicting consumption of the contents, or any other such display. In yet another example, the playback controller 120 may delay sending the instruction for a predetermined duration, such as 5 seconds, 10 seconds, 30 seconds, or any other duration, after detecting the stoppage of consumption. The predetermined delay facilitates the user 150 to resume the consumption. In an example, the playback controller 120 causes the media device 130 to display a counter 405. The counter 405 displays amount of time since the user 150 has paused consumption of the contents 160. The counter 405 resets once the user 150 resumes the consumption. In an example, the playback controller 120 sends the value of the timer to the media device 130 for display. The media device 130 may superimpose the counter 405 on the user interface. In another example, the playback controller 120 sends to the media device 130 an indication to start a timer that is used to display the counter 405.

In addition, in another example, the playback controller 120 may cause the media device 130 to display a user interface element 410. The user interface element 410 facilitates resuming playback of the media even if the user 150 has stopped consuming the contents 160. However, the user interface element 410 facilitates such resumption upon entry of a specific code. The entry of a specific code ensures that the resumption is being initiated by an adult or a different user other than the user 150. For example, the specific code may involve a calculation, or responding to a question, or the like, which may typically be done by a person above a particular age.

In case the playback controller 120 determines that the contents are empty, the playback controller 120 sends an instruction to modify the media playback according to consumption completed, as shown at block 335. In an example, the instruction sent upon completion of consumption may continue playback of the media. In yet another example, the instruction may cause the media device 130 to display the user interface that congratulates the user 150 upon completion of the consumption in the message 402. In another example, the media playback may pause upon completion of the contents 160, and in response to the instruction. The user interface element 410 may facilitate resuming the media playback, in this case, without any specific code, as was entered in case of the paused consumption. In another example, the playback controller 120 may cause the media device 130 to display another user interface element that facilitates a parent, guardian, teacher, or the like to enter the amount, type, and other information of the contents 160 consumed in a log. For example, upon using the other user interface element a log (or diary) application may be initiated on the media device 130. The log application facilitates keeping track of food and/or drinks consumed by the user 150.

Figure 5:
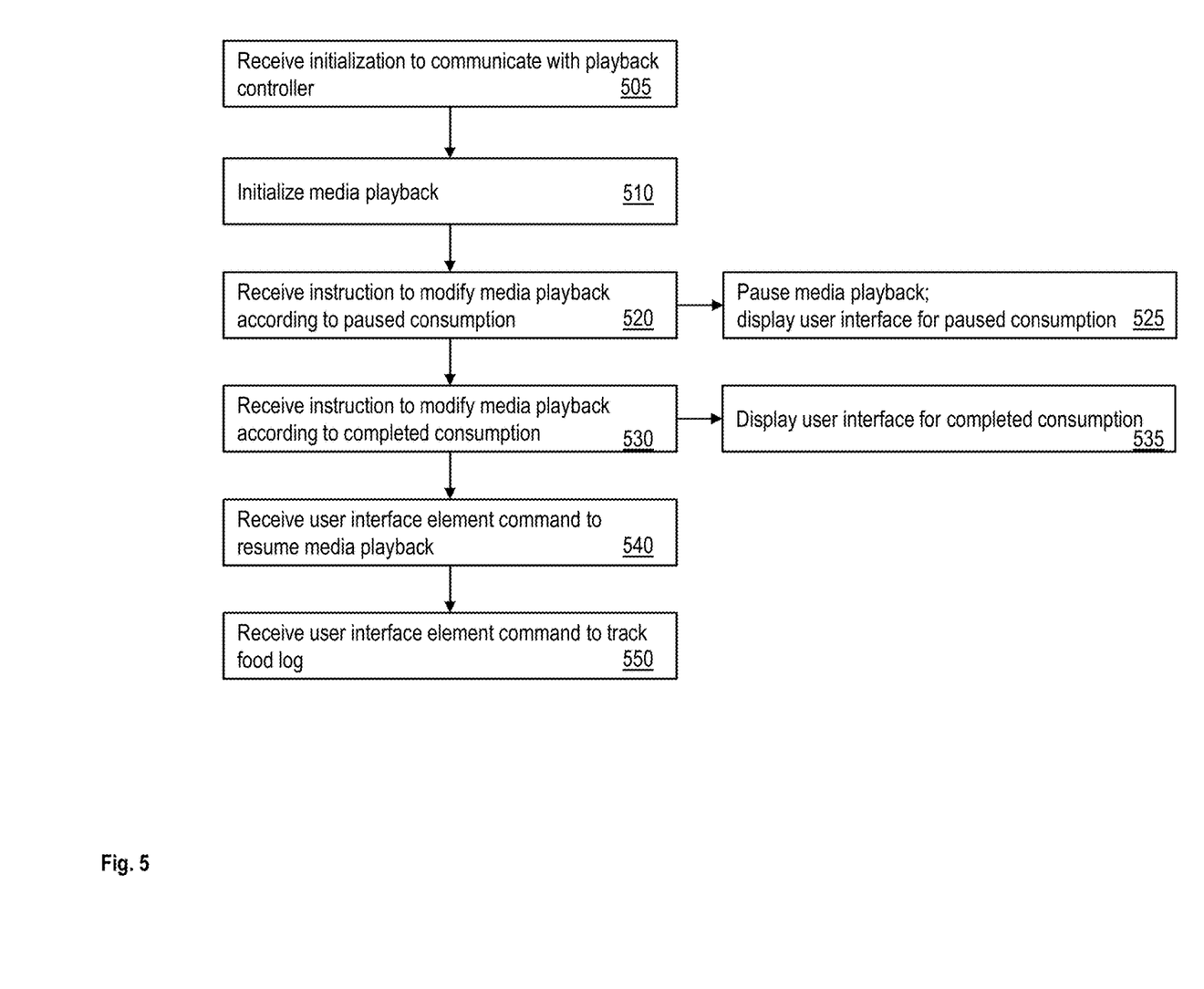
FIG. 5 illustrates a flowchart of operations of a media device in accordance with an embodiment.

In addition, the technical solutions may include the media device 130 that facilitates receipt of the instruction(s) from the playback controller 120 and respond as described throughout the present application. The media device 130 may include components similar to those illustrated in FIG. 2 and described above. FIG. 5 illustrates a flowchart of operations that the media device 130 may perform. The operations illustrated may not be in any specific order, and the media device 130 may implement the operations in a different order than what is illustrated. For example, the media device 130 receives an initialization to communicate with the playback controller 120, as shown at block 505. In response the media device 130 initializes media playback, as shown at block 510. For example, the media device 130 starts an application (software) that plays media files, such as a video player application. In another example, the media device 130 starts an application that plays streaming media, for example, Youtube®, Netflix®, HBOGo®, Pandora®, or any other streaming media service. The media device 130 facilitates media playback using the initialized application.

The media device 130 receives instruction(s) from the playback controller 120 and responds accordingly. For example, the media device 130 receives the instruction to modify media playback according to paused consumption, as shown at block 520. In response, the media device 130 pauses the media playback, as shown at block 525. In addition, pausing the media playback may include displaying the user interface that indicates to the user 150 that the media playback will resume once consumption is resumed, as shown at block 525. Further, the media device 130 may receive an instruction to modify media playback according to completed consumption, as shown at block 530. The media device 130, in response, may display the user interface that indicates to the user that the contents have been consumed, as shown at block 535.

The user interface(s) displayed, may include user interface elements. The media device 130 may receive commands from the user or a guardian, parent, teacher, or the like of the user 150 via the user interface elements. For example, the media device 130 may receive a command to resume paused media playback via the user interface element, as shown at block 540. As described earlier, the media device 130 ensures that the media playback is resumed by an adult, or a responsible user other than the user 150 by requesting entry of a specific code, or an answer to particular types of questions. In another example, a biometric identification, such as a fingerprint, voice, iris, face, or the like may be used to resume playback in case the media playback is paused in response to paused consumption. In another case, if the media playback is paused in response to completed consumption, the media device 130 may not check for specific code, biometric identification, or other such parameters when resuming playback. Further yet, the media device 130 receives a command from the user interface element to track food consumption in a food log, as shown at block 550. For example, the media device 130 may initializes a food tracking application in response to the command to track food consumption.

The present technical solutions may be part of, or may be implemented as a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present technical solutions have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. An apparatus comprising:
    a processor configured to receive an amount of contents in a vessel; and
    a communication interface configured to transmit, for receipt by a media playback device, a signal in response to a predetermined threshold being greater than a rate of change of the amount of contents, wherein the signal comprises an instruction to pause an ongoing media playback on the media playback device.

2. The apparatus of claim 1, further comprising:
    a sensor configured to detect the amount of contents in the vessel and transmit the amount for receipt by the processor.

3. The apparatus of claim 2, wherein the sensor detects the amount of contents based on weight of the vessel.

4. The apparatus of claim 2, wherein the sensor detects the amount of contents based on displacement of the contents, the contents being fluid.

5. The apparatus of claim 1, wherein the processor is configured to calculate the rate of change of the amount of contents based on the amount of contents and a previous amount of contents.

6. The apparatus of claim 1, wherein the a communication interface is further configured to transmit, to the media playback device, a second signal in response to the predetermined threshold being surpassed by the rate of change of the amount of contents, wherein the second signal comprises an instruction to resume the ongoing media playback on the media playback device.

7. The apparatus of claim 1, wherein the media playback comprises video playback.

8. The apparatus of claim 1, wherein the signal is transmitted in a wireless communication network.

9. The apparatus of claim 1, wherein the signal is transmitted in a wired communication network.

10. An apparatus comprising:
a sensor unit configured to detect a rate of change of an amount of contents in a vessel; and
a communication unit communicably connected to the sensor unit, the communication unit configured to transmit, for receipt by a-media playback device, a signal in response to a predetermined threshold being greater than the rate of change of the amount of contents, wherein the signal indicates to the media playback device to pause an ongoing media playback.

11. The apparatus of claim 10, wherein the sensor unit detects the rate of change of the amount of contents based on monitoring a weight of the contents.

12. The apparatus of claim 10, wherein the sensor unit detects the rate of change of the amount of contents based on monitoring a displacement of the contents.

13. The apparatus of claim 10, wherein the sensor unit detects the rate of change of the amount of contents based on monitoring a volume of the contents.

14. The apparatus of claim 10, wherein the communication unit is further configured to transmit, for receipt by the media playback device, a second signal in response to the predetermined threshold being surpassed by the rate of change of the amount of contents, wherein the second signal indicates to the media playback device to resume the ongoing media playback.

15. A system comprising:
a transmitter device configured to transmit a signal in response to a rate of change of amount of contents in a container being less than a predetermined threshold, the signal being transmit for receipt by a receiver; and
the receiver device configured to modify media playback in response to receipt of the signal, the modification comprising pausing an ongoing media playback on the receiver device.

16. The system of claim 15 further comprising: a sensor unit configured to detect the rate of change of the amount of the contents in the container, the sensor unit being communicably connected with the transmitter device.

17. The system of claim 16, wherein the signal is a first signal and the transmitter device is further configured to transmit a second signal for receipt by the receiver device in response to the rate of change of the amount of contents in the container being equal to or more than the predetermined threshold the second signal causing a resumption of the ongoing media playback.

18. The system of claim 16, wherein the sensor unit detects the rate of change of the amount of the contents based on monitoring a flow of the contents through an outlet of the container.

19. The system of claim 16, wherein the sensor unit detects the rate of change of the amount of the contents based on monitoring a weight of the contents in the container.

20. The system of claim 16, wherein the sensor unit detects the rate of change of the amount of contents based on monitoring a volume of the contents.

* * * * *